G. MINTZ.
CUTTING DIE.
APPLICATION FILED MAR. 7, 1917.
1,239,289.
Patented Sept. 4, 1917.
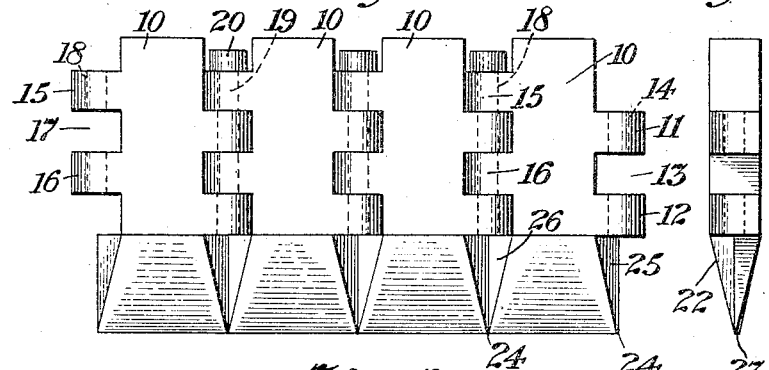
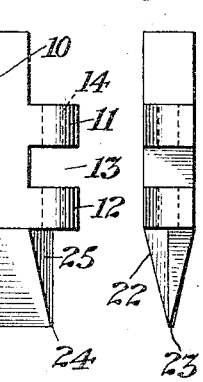
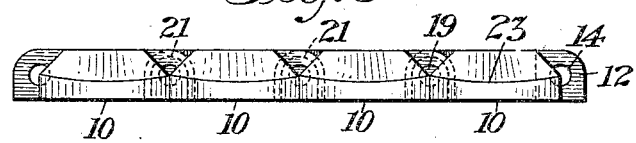
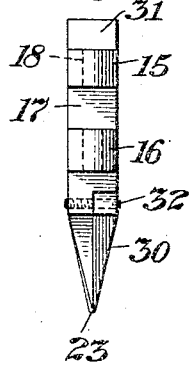
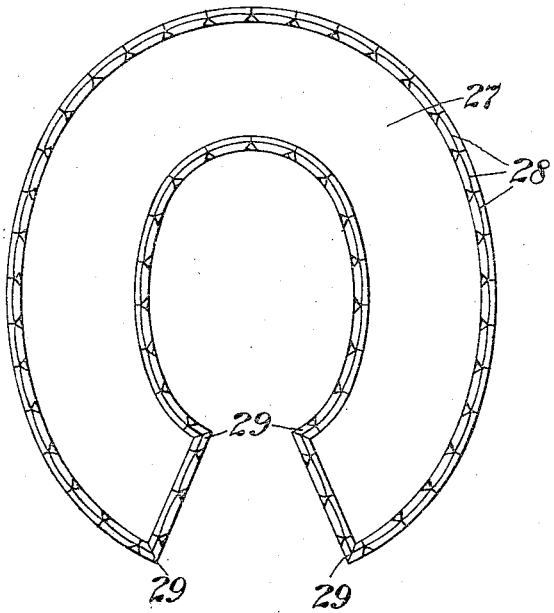
INVENTOR
Gabriel Mintz
BY
HIS ATTORNEYS

UNITED STATES PATENT OFFICE.

GABRIEL MINTZ, OF BROOKLYN, NEW YORK.

CUTTING-DIE.

1,239,289.  Specification of Letters Patent.  Patented Sept. 4, 1917.

Application filed March 7, 1917.  Serial No. 152,976.

*To all whom it may concern:*

Be it known that I, GABRIEL MINTZ, a subject of the Emperor of Russia, residing in the borough of Brooklyn, county of Kings, and State of New York, have invented an Improvement in Cutting-Dies, of which the following is the specification.

This invention relates to a cutting die and more particularly to a die adapted to be adjusted to different curves in cutting forms from felt or other material for ladies' hats as well as other garments. Heretofore so far as I am aware, in cutting the forms for hats as well as the linings therefor, and in cutting similar parts in various other garments for wearing apparel, it has been customary to make a separate die for each individual form or shape into which the material is cut. As will be readily understood, these forms or shapes are numerous and also change frequently, at least as often as the fashion changes. It is also appreciated that the expense of manufacturing a die for each individual form or shape into which the material is cut is a decidedly large item in the cost of producing the articles. This is so to such an extent that when any particular form or shape is to be little used, or when it is anticipated it will soon be superseded it does not pay to go to the expense of making the cutting die, and in such instances the cutting work is done by hand.

The object of my invention is to overcome these difficulties and disadvantages by providing a cutting die which within reasonable limits is adjustable to cut material on curved lines and into various configurations for the purposes hereinbefore generally indicated. In carrying out my invention I employ a die comprising a plurality of similarly formed units suitably hinged together so as to swing on one another, and each comprising a body portion and a cutting portion. The body portions are hinged to each other in building up the cutting die and the cutting portions are so sharpened that the cutting edge is concavo-convex with the corners lying in the axial centers of the pivots on which the units turn in being adjusted to position to cut a form of any particular shape. In the use of this instrument a sufficient number of units are connected to cut the required form, the material is laid upon a table of a suitable press in any desired number of layers, a pattern is placed over the material and the cutting die adjusted to position around the pattern; then the head of the press is brought down upon the top of the die to force the cutting edges through the material thus effecting the cut, it being understood that in order to obtain sufficient strength as well as to secure an edge which will remain sharp a reasonable length of time, the highest grade steel must be employed in making my improved cutting die.

This invention will be hereinafter more fully described in connection with the accompanying drawing in which:

Figure 1 is an elevation showing the rear sides of a number of units forming a cutting die.

Fig. 2 is an edge view of one of the units.

Fig. 3 is a plan of the parts as shown in Fig. 1.

Fig. 4 is a diagrammatic plan illustrating the use of the cutting die, and

Fig. 5 is an elevation showing a modified form of the invention.

Referring particularly to the drawing it will be seen that in carrying out this invention I employ a plurality of units in the cutting die and each unit comprises a body portion 10 preferably rectangular in configuration and provided on one side with spaced lugs 11 and 12 with an intervening recess 13, the lugs being bored as indicated at 14, while on the opposite side there are similar lugs 15 and 16 with an intervening recess 17, while the lugs 15 and 16 are bored as indicated at 18. The lugs 11 and 12 are placed in a staggered relationship to the lugs 15 and 16 so that the body portions of the cutting die units may be hinged together by interlocking the lugs on the right hand side of one unit with the lugs on the left hand side of another unit and the parts connected by pins or bolts 19 each of which is provided with a head indicated at 20 as shown in Fig. 3, while the inner side of each head 20 is preferably rounded at 21 in order to permit the adjustment of the units to position.

Each unit of the cutting die also includes a cutting portion 22 terminating in a concavo-convex cutting edge as indicated at 23. The ends or corners 24 of this cutting edge are in the axial line with the pivot pins 19 as is also clearly indicated in Figs. 1 and 3 of the drawing. The reason for this is to maintain the corners of the cutting edges of adjacent units in contact with one another irrespective of the positions they may be caused to assume to cause the cut made by the die to be continuous. In the inner surface the cutting portion of each unit is recessed or cut away as indicated at 25 and 26 in the drawing in order also to permit the adjustment of the units to position on their hinges.

In Fig. 4 I have illustrated diagrammatically the manner in which the cutting die is employed in cutting out a horse-shoe shaped piece of material as indicated at 27, each of the cutting die units being indicated at 28 in this figure. In cutting out such a figure a pattern of cardboard or other suitable material is first made, the material itself placed on a table of a suitable press, the pattern placed over the material, and the cutting die adjusted to position around the edges of the pattern, a sufficient number of units being employed to complete the outline of the design; whereupon the head of the press is brought down upon the upper ends of the units of the cutting die to force the cutting edges through the material thus making the cut. I have shown the configuration illustrated in Fig. 4 to bring out the fact that in some instances it is necessary to employ angular units in my improved cutting die. These units are indicated diagrammatically at 29 in this figure, and are adapted as illustrated, to form the corners for the ends of the piece of material to be cut. These angular members are made in all respects similar to the units hereinbefore described with the exception of having cutting edges made at an angle to each other. It will also be understood that the width of the units may vary and any suitable number may be connected in forming a die of sufficient extent to cut a desired form from the material being used.

By reference to Fig. 5 it will be seen that the cutting portion of each member of the die may be made separately from the body portion thereof. In this figure the cutting portion of the die element is indicated at 30, while the body portion is indicated at 31. The adjacent parts of these members are suitably flanged to interlock and are connected by suitable screws 32 or otherwise. In other respects the elements of the cutting die are the same as those hereinbefore described, and as will be understood, the object in making the die as shown in Fig. 5 is to reduce the cost of its manufacture as in this construction the body portions of each die unit may be cast.

I claim as my invention:

1. In a cutting die, a plurality of relatively narrow interchangeable units each comprising a body portion and a cutting portion having a slightly concavo-convex cutting edge, and means for pivotally connecting the cutting units together at the sides thereof so that the die may be shaped to make a continuous cut of desired configuration.

2. In a cutting die, a plurality of relatively narrow interchangeable similar units each comprising a body portion and a cutting portion having a slightly concavo-convex cutting edge, and means for pivotally connecting the sides of the body members of the units together so that the die may be shaped to make a cut of desired configuration, the corners of the cutting edge of each unit lying in the axes of the pivots by which the unit is connected to the next adjacent units so that the cut made thereby is continuous.

3. In a cutting die, a plurality of relatively short similar units each comprising a body portion and a cutting portion having a slightly concavo-convex cutting edge, lugs on one side of a body portion of each unit, lugs in a staggered relationship on the other side of the body portion of each unit, pivot pins passing through said lugs for connecting the units together, the cutting edge of each unit being so formed that the corners thereof lie in the axes of the pivots by which the said unit is connected to the next adjacent units, and the outer parts of the sides of the cutting portion of each unit being flat and in a plane at right angles to the face of the body member of the unit while the inner parts of the sides of the cutting portion of each unit are tapered from the cutting points so that the units may be turned to a straight line position to make a straight cut and also inwardly to make a curved cut.

Signed by me this 19th day of February, 1917.

GABRIEL MINTZ.

Copies of this patent may be obtained for five cents each, by addressing the "Commissioner of Patents, Washington, D. C."